US012803291B2

(12) United States Patent
Zhang et al.

(10) Patent No.: US 12,803,291 B2
(45) Date of Patent: Nov. 17, 2026

(54) CONTROL APPARATUS USED IN MICROGRID SYSTEM, CONTROL METHOD, AND MICROGRID SYSTEM

(71) Applicant: Huawei Digital Power Technologies Co., Ltd., Shenzhen (CN)

(72) Inventors: Lingjie Zhang, Shanghai (CN); Hongwu She, Shanghai (CN); Jiahong Wu, Shanghai (CN); Pengfei Cheng, Shanghai (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/983,820

(22) Filed: Dec. 17, 2024

(65) Prior Publication Data

US 2025/0202241 A1 Jun. 19, 2025

(30) Foreign Application Priority Data

Dec. 18, 2023 (CN) ........................ 202311749727.5

(51) Int. Cl.
*H02J 3/388* (2026.01)
*H02J 3/001* (2026.01)

(52) U.S. Cl.
CPC .............. *H02J 3/388* (2020.01); *H02J 3/001* (2020.01)

(58) Field of Classification Search
CPC ........ H02J 3/388; H02J 3/001; H02J 2105/10; H02J 3/381; H02J 3/0012; H02J 3/38
See application file for complete search history.

(56) References Cited

FOREIGN PATENT DOCUMENTS

| | | | |
|---|---|---|---|
| CN | 102856924 | A | 1/2013 |
| CN | 102983593 | A | 3/2013 |
| CN | 104201706 | A | 12/2014 |
| CN | 105896488 | A | 8/2016 |
| CN | 205565459 | U | 9/2016 |
| CN | 106022503 | A | 10/2016 |
| CN | 108847690 | A | 11/2018 |
| CN | 109888829 | A | 6/2019 |
| CN | 109921470 | A | 6/2019 |
| CN | 209046272 | U | 6/2019 |
| CN | 209046273 | U | 6/2019 |
| CN | 106816888 | B | 12/2019 |
| CN | 111697619 | A | 9/2020 |
| CN | 114069696 | A | 2/2022 |
| CN | 114336726 | A | 4/2022 |
| CN | 110912108 | B | 10/2022 |
| CN | 115693748 | A | 2/2023 |
| JP | 6770635 | B2 | 10/2020 |

*Primary Examiner* — Daniel Cavallari
(74) *Attorney, Agent, or Firm* — Maier & Maier, PLLC

(57) ABSTRACT

A control apparatus used in a microgrid system, a control method, and a microgrid system. The control apparatus is configured to communicatively connect to M converters and a point of interconnection switch, where M≥1, and a microgrid bus is configured to connect to an external grid via the point of interconnection switch. The control apparatus is configured to: if a quantity of converters that switch to a voltage source mode at a third moment is greater than or equal to the first threshold, control the point of interconnection switch to be turned off, and control the M converters to operate in the voltage source mode; otherwise, control the M converters to operate in a current source mode.

13 Claims, 7 Drawing Sheets

CONTROL APPARATUS USED IN MICROGRID SYSTEM, CONTROL METHOD, AND MICROGRID SYSTEM

CROSS-REFERENCE TO RELATED APPLICATION

This application claims priority to Chinese Patent Application No. 202311749727.5, filed on Dec. 18, 2023, which is hereby incorporated by reference in its entirety.

TECHNICAL FIELD

The embodiments relate to the energy field, and to a control apparatus used in a microgrid system, a control method, and a microgrid system.

BACKGROUND

A microgrid is a small power supply network that mainly uses distributed power supplies and uses energy storage and control apparatuses to perform real-time adjustment to balance electric power and energy inside the microgrid. The microgrid has two operating modes: on-grid and off-grid. The on-grid mode means that in a normal case, the microgrid operates in connection to a large grid to supply surplus electric energy to the large grid, or the large grid supplies power to a local load and charges a battery. The off-grid mode means that when it is detected that the large grid is faulty or electric energy quality does not meet requirements, the microgrid is disconnected from the large grid to form an islanding state, and the distributed power supplies and an energy storage battery in the microgrid supply power to the local load. However, during on-grid operation, a microgrid system may be affected by an unexpected event like fluctuation/a fault of an external grid, and incorrect switching of the on/off-grid operating mode may occur. In addition, frequent incorrect switching shortens a service life of a point of interconnection switch, and increases operating costs of the microgrid.

Therefore, in the microgrid system, a proper on/off-grid switching technology needs to be used to isolate disturbance of the external grid, to ensure continuous operation of the microgrid system.

SUMMARY

The embodiments provide a control apparatus used in a microgrid system, a control method, and a microgrid system, so that when a microgrid faces different external grid faults, continuous stability of the microgrid can be ensured by using a proper on/off-grid switching technology.

According to a first aspect, a control apparatus used in a microgrid system is provided. The microgrid system includes the control apparatus, a microgrid bus, a point of interconnection switch, and M converters, where M≥1, the control apparatus is configured to communicatively connect to the at least one converter and the point of interconnection switch, and the microgrid bus is configured to connect to an external grid via the point of interconnection switch. The control apparatus is configured to: in response to that a fluctuation amplitude of electrical data that is detected at a point of interconnection at a first moment and that is relative to a reference value is greater than or equal to a first threshold, detect electrical data at the point of interconnection at a second moment, where the second moment is later than the first moment. The control apparatus is further configured to: in response to that a fluctuation amplitude of the electrical data that is detected at the point of interconnection at the second moment and that is relative to the reference value is less than the first threshold, and a quantity of converters operating in a voltage source mode at a third moment is greater than or equal to a second threshold, control the point of interconnection switch to be turned off, and control the M converters to operate in the voltage source mode, where the third moment is later than the second moment. The control apparatus is further configured to: in response to that the fluctuation amplitude of the electrical data that is detected at the point of interconnection at the second moment and that is relative to the reference value is less than the first threshold, and the quantity of converters operating in the voltage source mode at the third moment is less than the second threshold, control the point of interconnection switch to be turned on, and control the M converters to operate in a current source mode.

It should be understood that, before the external grid is faulty, the microgrid system is connected in parallel to the external grid and operates; that is, the point of interconnection switch is in a turn-on state, and all the M converters in the on-grid system operate in the current source mode.

It should be understood that the reference value is the electrical data at the point of interconnection when the microgrid system is connected in parallel to the external grid and operates normally, and the fluctuation amplitude of the electrical data relative to the reference value is a difference between actual electrical data at the point of interconnection and the reference value at a same moment (for example, the first moment).

It should be understood that, in this embodiment, the M converters are power supply devices that have the voltage source mode and the current source mode, and can perform mode switching. In addition, the converter can automatically detect a fault or an exception at an alternating current end of the converter, and when a set condition is met, automatically switches from the current source mode to the voltage source mode.

It should be understood that the control apparatus can determine operating modes of the M converters through communicatively connecting to the M converters, and the control apparatus can control turn-on and turn-off of the point of interconnection switch and the operating modes of the M converters through communication connections.

It should be understood that the control apparatus may be an integrated control apparatus, or the control apparatus includes a plurality of control units with different functions. This is not limited in this embodiment.

It should be understood that the electrical data at the point of interconnection includes at least one of a current, a voltage, or a frequency at the point of interconnection.

It should be understood that an interval between the first moment and the second moment is not limited in this embodiment. For example, the interval between the first moment and the second moment is 200 milliseconds (ms).

It should be understood that an interval between the first moment and the third moment is not limited in this embodiment. For example, the interval between the first moment and the third moment is 300 milliseconds.

It should be understood that, that the control apparatus controls the M converters to operate in the voltage source mode can be understood as that the control apparatus sends a first signal to the M converters, or the control apparatus sends a first signal to a converter that is in the M converters and that does not switch to the voltage source mode, where the first signal indicates the converter to operate in the voltage source mode.

Based on the foregoing solution, in response to that the fluctuation amplitude of the electrical data that is detected by the control apparatus at the point of interconnection at the first moment and that is relative to the reference value is greater than or equal to the first threshold, the control apparatus detects the fluctuation amplitude of the electrical data at the point of interconnection at the second moment. Further, in response to that the fluctuation amplitude of the electrical data at the point of interconnection at the second moment relative to the reference value is less than the first threshold, and the quantity of converters operating in the voltage source mode in the microgrid system at the third moment is greater than or equal to the second threshold, the control apparatus controls a microgrid to operate off-grid; otherwise, controls the microgrid to maintain on-grid operation. In the embodiments, the control apparatus may determine a fault status of the external grid with reference to the fluctuation amplitude of the electrical data at the point of interconnection at the second moment relative to the reference value and the quantity of converters operating in the voltage source mode at the third moment, to improve accuracy of detecting the fault of the external grid, and in this way, when the microgrid faces different external grid faults, a proper on/off-grid switching technology can be used to ensure continuous stability of the microgrid.

With reference to the first aspect, in some implementations of the first aspect, the control apparatus is further configured to: in response to that the fluctuation amplitude of the electrical data that is detected at the point of interconnection at the second moment and that is relative to the reference value is greater than or equal to the first threshold, control the point of interconnection switch to be turned off, and control the M converters to operate in the voltage source mode.

Based on the foregoing solution, in response to that the fluctuation amplitude of the electrical data detected at the point of interconnection at the second moment is greater than or equal to the first threshold, the control apparatus may control the point of interconnection switch to be turned off, and control the at least one converter to operate in the voltage source mode. In this way, when a fault of the external grid is a non-temporary fault, correct off-grid of the microgrid system can be ensured.

With reference to the first aspect, in some implementations of the first aspect, the control apparatus is further configured to: in response to that the quantity of converters operating in the voltage source mode at the third moment is less than the second threshold and greater than or equal to a third threshold, send an indication signal to at least one of the M converters, where the indication signal indicates the at least one converter to change output electrical data, and the third threshold is less than the second threshold.

With reference to the first aspect, in some implementations of the first aspect, the control apparatus is further configured to: in response to that the quantity of converters operating in the voltage source mode at the third moment is less than a third threshold, control the point of interconnection switch to be turned on, and control the M converters to operate in the current source mode.

It should be understood that, after the at least one converter changes the output electrical data, the control apparatus may determine, by detecting the electrical data at the point of interconnection, whether the microgrid system is off-grid. Further, in response to that the microgrid system operates in an off-grid mode, the control apparatus is configured to: control the point of interconnection switch to be turned off, and control the M converters to operate in the voltage source mode; and in response to that the microgrid system operates in an on-grid mode, the control apparatus is configured to control the point of interconnection switch to be turned on, and control the M converters to operate in the current source mode.

It should be understood that a specific form of a disturbance signal sent by the control apparatus is not limited in this embodiment.

As an example instead of a limitation, the at least one converter changes the output voltage. If the control apparatus detects that the fluctuation of the voltage of the point of interconnection switch exceeds the threshold, the control apparatus indicates the point of interconnection switch to be turned off, and indicates the at least one converter to switch to the voltage source mode.

Based on the foregoing solution, the control apparatus can, in response to that the fluctuation amplitude of the electrical data that is detected at the point of interconnection at the second moment and that is relative to the reference value is less than the first threshold, and the quantity of converters operating in the voltage source mode at the third moment is less than the second threshold and greater than or equal to the third threshold, indicate, by using an instruction signal, the at least one converter to change output electrical data to perform overall active anti-islanding protection of the microgrid, to determine, based on a detection result of the anti-islanding protection, whether to perform on/off-grid switching, thereby improving real-time performance and reliability of the on/off-grid switching of the microgrid system.

With reference to the first aspect, in some implementations of the first aspect, the control apparatus is further configured to: in response to that the fluctuation amplitude of the electrical data that is detected at the point of interconnection at the first moment and that is relative to the reference value is greater than or equal to a fourth threshold, control the point of interconnection switch to be turned off, and control the M converters to operate in the voltage source mode, where the fourth threshold is greater than the first threshold.

Based on the foregoing solution, when the fluctuation amplitude of the electrical data that is detected at the point of interconnection at the first moment and that is relative to the reference value is greater than or equal to the fourth threshold, the control apparatus controls the point of interconnection switch to be turned off, and controls the M converters to operate in the voltage source mode. In this way, when a serious fault occurs in the external grid, the microgrid system can be controlled to quickly switch to the off-grid mode.

With reference to the first aspect, in some implementations of the first aspect, the control apparatus is configured to: continuously detect the electrical data at the point of interconnection between the first moment and the second moment, and/or continuously detect operating modes of the M converters between the second moment and the third moment.

It should be understood that, if the control apparatus detects, at any moment of continuous detection, that the fluctuation amplitude of the electrical data at the point of interconnection is greater than or equal to the fourth threshold, the control apparatus controls the point of interconnection switch to be turned off, and controls the M converters to operate in the voltage source mode.

With reference to the first aspect, in some implementations of the first aspect, the control apparatus includes a first control unit and a second control unit. The first control unit is configured to communicatively connect to the point of interconnection switch, and the second control unit is configured to communicatively connect to the M converters. The first control unit is configured to detect the electrical data at the point of interconnection, and the second control unit is configured to detect the operating modes of the M converters. The first control unit and the second control unit are communicatively connected.

According to a second aspect, a control method is provided. The method includes: in response to that a fluctuation amplitude of electrical data that is detected at a point of interconnection at a first moment and that is relative to a reference value is greater than or equal to a first threshold, detecting electrical data at the point of interconnection at a second moment, where the second moment is later than the first moment. The method further includes: in response to that a fluctuation amplitude of the electrical data that is detected at the point of interconnection at the second moment and that is relative to the reference value is less than the first threshold, and a quantity of converters operating in a voltage source mode at a third moment is greater than or equal to a second threshold, controlling a point of interconnection switch to be turned off, and controlling M converters to operate in the voltage source mode, where the third moment is later than the second moment. The method further includes: in response to that the fluctuation amplitude of the electrical data that is detected at the point of interconnection at the second moment and that is relative to the reference value is less than the first threshold, and the quantity of converters operating in the voltage source mode at the third moment is less than the second threshold, controlling the point of interconnection switch to be turned on, and controlling the M converters to operate in a current source mode. The M converters are connected to an external grid via the point of interconnection switch.

With reference to the second aspect, in some implementations of the second aspect, the method further includes: in response to that the fluctuation amplitude of the electrical data that is detected at the point of interconnection at the second moment and that is relative to the reference value is greater than or equal to the first threshold, controlling the point of interconnection switch to be turned off, and controlling the M converters to operate in the voltage source mode.

With reference to the second aspect, in some implementations of the second aspect, the method further includes: in response to that the quantity of converters operating in the voltage source mode at the third moment is less than the second threshold and greater than or equal to a third threshold, sending an indication signal to at least one of the M converters, where the indication signal indicates the at least one converter to change output electrical data, and the third threshold is less than the second threshold.

With reference to the second aspect, in some implementations of the second aspect, the method further includes: in response to that the quantity of converters operating in the voltage source mode at the third moment is less than a third threshold, controlling the point of interconnection switch to be turned on, and controlling the M converters to operate in the current source mode.

With reference to the second aspect, in some implementations of the second aspect, the method further includes: in response to that the fluctuation amplitude of the electrical data detected at the point of interconnection at the first moment is greater than or equal to a fourth threshold, controlling the point of interconnection switch to be turned off, and controlling the M converters to operate in the voltage source mode, where the fourth threshold is greater than the first threshold.

With reference to the second aspect, in some implementations of the second aspect, the method further includes: in response to that the fluctuation amplitude of the electrical data that is detected at the point of interconnection at the first moment and that is relative to the reference value is greater than or equal to a fourth threshold, controlling the point of interconnection switch to be turned off, and controlling the M converters to operate in the voltage source mode, where the fourth threshold is greater than the first threshold.

According to a third aspect, a control apparatus used in a microgrid system is provided. The microgrid system includes the control apparatus, a microgrid bus, a point of interconnection switch, and M converters, where M≥1, the control apparatus is configured to communicatively connect to the at least one converter and the point of interconnection switch, and the microgrid bus is configured to connect to an external grid via the point of interconnection switch. The control apparatus is configured to: in response to that it is detected, at a first moment, that an operating mode of at least one of the M converters changes, detect electrical data at a point of interconnection at a second moment, where the second moment is later than the first moment. The control apparatus is further configured to: in response to that a fluctuation amplitude of the electrical data that is detected at the point of interconnection at the second moment and that is relative to a reference value is less than a first threshold, and a quantity of converters operating in a voltage source mode at a third moment is greater than or equal to a second threshold, control the point of interconnection switch to be turned off, and control the M converters to operate in the voltage source mode, where the third moment is later than the second moment. The control apparatus is further configured to: in response to that a fluctuation amplitude of the electrical data that is detected at the point of interconnection at the second moment and that is relative to a reference value is less than a first threshold, and a quantity of converters operating in a voltage source mode at a third moment is less than a second threshold, control the point of interconnection switch to be turned on, and control the M converters to operate in a current source mode.

According to a fourth aspect, a control method is provided. The method includes: in response to that it is detected, at a first moment, that an operating mode of at least one of M converters changes, detecting electrical data at a point of interconnection at a second moment, where the second moment is later than the first moment. The method further includes: in response to that a fluctuation amplitude of the electrical data that is detected at the point of interconnection at the second moment and that is relative to a reference value is less than a first threshold, and a quantity of converters operating in a voltage source mode at a third moment is greater than or equal to a second threshold, controlling a point of interconnection switch to be turned off, and controlling M converters to operate in the voltage source mode, where the third moment is later than the second moment. The method further includes: in response to that a fluctuation amplitude of the electrical data that is detected at the point of interconnection at the second moment and that is relative to a reference value is less than a first threshold, and a quantity of converters operating in a voltage source mode at a third moment is less than a second threshold, controlling the point of interconnection switch to be turned on, and controlling the M converters to operate in a current source mode. The M converters are connected to an external grid via the point of interconnection switch.

According to a fifth aspect, a microgrid system is provided, including the control apparatus according to the first aspect or any implementation of the first aspect, a microgrid bus, a point of interconnection switch, M converters, and at least one load, where M≥1, the control apparatus is configured to communicatively connect to the M converters and the point of interconnection switch, the microgrid bus is configured to connect to an external grid via the point of interconnection switch, and the control apparatus is configured to: in response to that a fluctuation amplitude of electrical data that is detected at a point of interconnection at a first moment and that is relative to a reference value is greater than or equal to a first threshold, detect electrical data at the point of interconnection at a second moment, where the second moment is later than the first moment. The control apparatus is further configured to: in response to that a fluctuation amplitude of the electrical data that is detected at the point of interconnection at the second moment and that is relative to the reference value is less than the first threshold, and a quantity of converters operating in a voltage source mode at a third moment is greater than or equal to a second threshold, control the point of interconnection switch to be turned off, and control the M converters to operate in the voltage source mode, where the third moment is later than the second moment. The control apparatus is further configured to: in response to that the fluctuation amplitude of the electrical data that is detected at the point of interconnection at the second moment and that is relative to the reference value is less than the first threshold, and the quantity of converters operating in the voltage source mode at the third moment is less than the second threshold, control the point of interconnection switch to be turned on, and control the M converters to operate in a current source mode.

With reference to the third aspect, in some implementations of the third aspect, the control apparatus is further configured to: in response to that the fluctuation amplitude of the electrical data that is detected at the point of interconnection at the second moment and that is relative to the reference value is greater than or equal to the first threshold, control the point of interconnection switch to be turned off, and control the M converters to operate in the voltage source mode.

It should be understood that descriptions of supplements, explanations, and beneficial effects of the first aspect are also applicable to the second aspect to the fifth aspect. For brevity, details are not described again.

DETAILED DESCRIPTION OF EMBODIMENTS

The following describes solutions of the embodiments with reference to accompanying drawings.

Terms used in the following embodiments are merely intended to describe specific embodiments, but are not intended as limiting. Terms "one", "a", "the", "the foregoing", "this" and "the one" of singular forms used herein are also intended to include expressions such as "one or more", unless otherwise specified in the context clearly. It should be further understood that in the following embodiments, "at least one" and "one or more" mean one, two, or more. A term "and/or" describes an association relationship of associated objects and indicates that three relationships may exist. For example, A and/or B may indicate the following three cases: only A exists, both A and B exist, and only B exists, where A and B may be singular or plural. A character "/" can indicate an "or" relationship between the associated objects.

Referring to "an embodiment", "some embodiments", or the like indicates that one or more embodiments include a specific feature, structure, or characteristic described with reference to embodiments. Therefore, statements such as "in an embodiment", "in some embodiments", "in some other embodiments", and "in other embodiments" that appear at different places herein do not necessarily mean referring to a same embodiment. Instead, the statements mean "one or more but not all of embodiments", unless otherwise specifically emphasized in another manner. Terms "include", "have", and their variants all mean "include, but are not limited to", unless otherwise specifically emphasized in another manner.

For ease of understanding, some terms in embodiments are first described.

Figure 1:
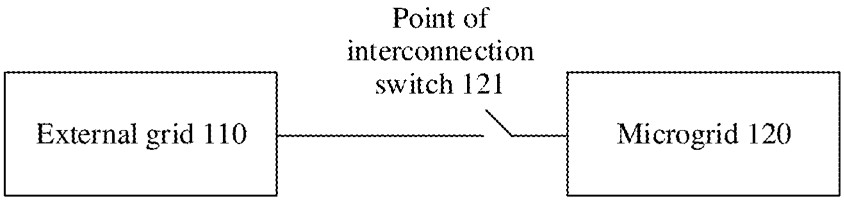
FIG. 1 is a diagram of an application scenario according to the embodiments.

Microgrid: is a small power supply network that can use distributed power supplies and uses energy storage and control apparatuses to perform real-time adjustment to balance electric power and energy inside the microgrid. The microgrid may operate in connection to an external grid or operate independently off the grid. As shown in FIG. 1, a system 100 includes an external grid 110 and a microgrid 120. The microgrid 120 is connected to the external grid 110 via a point of interconnection switch 121. When the point of interconnection switch 121 is in an on state, the microgrid 120 may be connected to the external grid (for example, a three-phase alternating current grid or a direct current grid). After the connection, the microgrid 120 may supply power to devices inside the microgrid or supply power to the external grid 110. In this embodiment, when the point of interconnection switch 121 is in the on state, the microgrid 120 is connected to the external grid 110. In this case, the microgrid is in an on-grid operating mode. When the point of interconnection switch 121 is in an off state, the microgrid 120 is disconnected from the external grid 110. In this case, the microgrid is in an off-grid operating mode, which is also referred to as an islanding operating mode or an islanding state.

The on-grid operating mode is an operating mode in which a power conversion system is connected to an alternating current grid synchronously, operates with a current source characteristic, and stores electric energy of the grid in a battery string or feeds energy of the battery string back to the grid. In embodiments, a PQ control manner can be used for the power conversion system in the on-grid operating mode. In this control manner, the power conversion system is controlled to output a constant power, and reactive power and active power of the power conversion system are controllable.

The off-grid operating mode is an operating mode in which the power conversion system operates with a voltage source characteristic to supply power to an alternating current side of an energy storage system or a connected grid.

In embodiments, the power conversion system in the off-grid operating mode operates in a virtual synchronous generator (VSG) mode. The VSG is an operation technology in which a mathematical model of a synchronous generator is embedded into a control algorithm of an inverter, and a static power electronic apparatus is simulated as a rotating motor, and the VSG has functions of a damping voltage, frequency rapid fluctuation, automatic power distribution, and synchronous grid operation by simulating primary frequency regulation and voltage regulation of the synchronous generator.

The power conversion system (PCS) is a converter that implements bidirectional conversion of electric energy in an electrochemical energy storage system, is connected between a battery system and a grid and/or a load, and may directly supply power to an alternating current load when there is no grid. The PCS includes a converter and a control unit. The PCS may control a charging and discharging process of the battery system. For example, the control unit of the PCS receives a background control instruction through communication, and controls, based on a symbol and a value of the power instruction, the converter to perform charging or discharging on the battery system, to adjust active power and reactive power of the grid. The control unit of the PCS communicates with a battery management system (BMS) through a controller area network (CAN) interface, to obtain battery string status information, so as to implement protective charging and discharging on the battery and ensure safe operation of the battery.

During on-grid operation, a microgrid system of AC coupling of PV and ESS may be affected by an unexpected event, like a fluctuation or a fault from outside of the grid. Therefore, in the microgrid system, a proper on/off-grid switching technology needs to be used to isolate disturbance from outside of the grid, to ensure continuous operation of the internal system of the microgrid. In other words, the on/off-grid switching technology is a key technology of the microgrid system and directly affects off-grid switching effect of the microgrid.

In some situations, an unplanned off-grid switching process of the microgrid can include the following steps: 1. Detect an exception. 2. Turn off a point of interconnection (POI) switch. 3. The power conversion system inside the microgrid switches from a current source mode to a voltage source mode. 4. A microgrid central controller (MGCC) performs off-grid control.

Currently, the off-grid switching solution in the industry can be used to improve a speed or smoothness of switching a control algorithm by the power conversion system PCS in a scenario in which the microgrid or the distributed power supply is open-circuited. However, for the off-grid switching of the microgrid system, if the microgrid system uses a sensitive off-grid switching manner, the microgrid is prone to disturbance or even false disturbance of an external grid and performs off-grid switching. This shortens a service life of the point of interconnection switch, increases an overhauling frequency for operation and maintenance, and increases operation costs of the microgrid system. In addition, in a process in which the microgrid performs off-grid switching, if switching occasions of the point of interconnection switch of the microgrid and the power conversion system PCS are inappropriate or inconsistent, a power outage caused by the off-grid switching occurs. For example, if the PCS switches to the voltage source mode excessively early, point of common coupling (PCC) detection is affected and operation rejection is caused. In this case, overload protection occurs on the PCS.

In a solution, after a fault is detected by the control apparatus of the microgrid, an instruction for the PCS to perform switching is delayed, so that the point of interconnection switch and the PCS complete switching at the same time. However, in this solution, there is no specific solution for the disturbance of the external grid, a frequency of incorrect switching caused by the disturbance of the external grid cannot be reduced, and a stable switching problem in a scenario in which a plurality of PCSs in the microgrid are parallel is not involved.

In another solution, whether the PCS switches to an off-grid mode is determined based on a fault ride-through curve of the grid. For example, the PCS detects, in real time, a change of a voltage of a large grid connected to the PCC. When the voltage of the large grid drops and drop time and a voltage amplitude meet a low voltage ride-through condition, the PCS maintains the on-grid operation and provides specific reactive power for the large grid to support recovery of the large grid. When the voltage of the large grid drops and the drop time and the voltage amplitude do not meet the low voltage ride-through condition, the power conversion system switches to off-grid operation to provide reliable electric energy power for a local load. However, this solution is a solution on a power station side, and cannot effectively identify and adapt to fault switching in a scenario in which a power distribution network (for example, a microgrid) is connected. In addition, if low voltage ride-through time is excessively long, all loads inside the microgrid are protected, and a value of internal protection is lost in the off-grid switching of the microgrid.

In view of this, embodiments provide a control apparatus used in a microgrid system, a control method, and a microgrid system, to improve accuracy of detecting a fault of an external grid by a microgrid, so that the microgrid is correctly off-grid when encountering an external permanent fault, and the microgrid does not need to be forced to disconnect from the main grid when a short-time or transient minor fault occurs, thereby reducing incorrect switching, ensuring continuous stability of the microgrid, and ensuring cost-effectiveness of the microgrid system.

Figure 2:
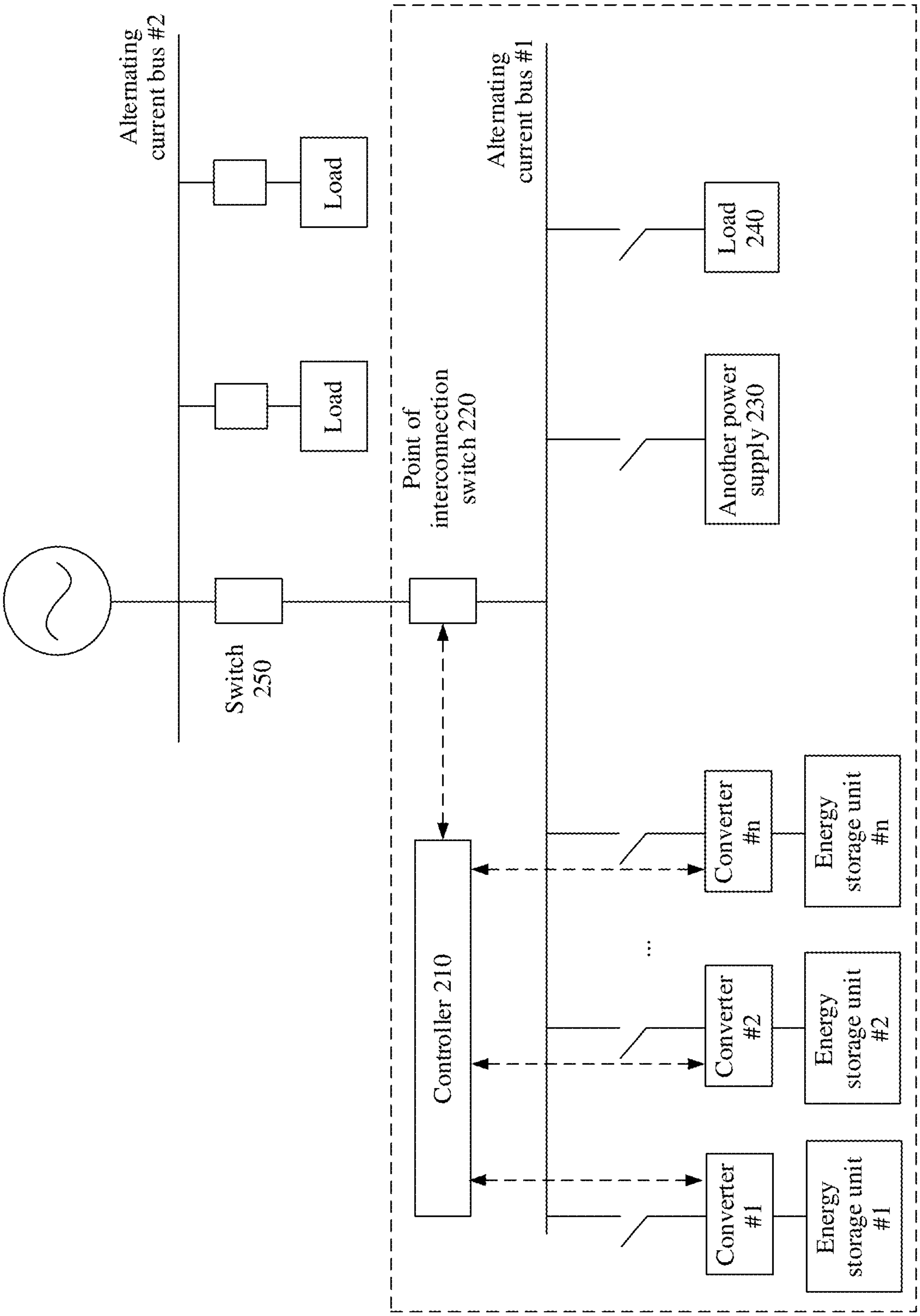
FIG. 2 is a diagram of an architecture of a microgrid system to which an embodiment is applicable.

FIG. 2 is a diagram of an architecture of a microgrid system to which an embodiment is applicable.

As shown in FIG. 2, the system includes a control apparatus 210, a point of interconnection switch 220, a plurality of converters, another power supply 230 (for example, photovoltaic power generation), and a load 240. One end of the point of interconnection switch 220 is connected to an alternating current bus #2 of a grid through a switch 250 on a transmission line path, and the alternating current bus #2 is connected to the upper-level grid. There may be another power distribution branch and another power distribution switch on the alternating current bus #2. This is not limited in this embodiment. The other end of the point of interconnection switch 220 is connected to an alternating current bus #1, and the alternating current bus #1 is connected to a converter #1, a converter #2, . . . , a converter #n, and the like. One end of the converter #1 is connected to the alternating current bus #1 via a switch, and the other end of the converter #1 is connected to an energy storage unit #1. One end of the converter #2 is connected to the alternating current bus #1 via a switch, and the other end of the converter #2 is connected to an energy storage unit #2. One end of the converter #n is connected to the alternating current bus #1 via a switch, and the other end of the converter #n is connected to an energy storage unit #n.

In addition, the control apparatus 210 is communicatively connected to each converter, to monitor an operating mode of the converter. In addition, the control apparatus 210 is further communicatively connected to the point of interconnection switch 220, to monitor turn-on and turn-off of the point of interconnection switch 220.

It should be understood that the control apparatus can be communicatively connected to another voltage in the system. For brevity, details are not described in this embodiment.

It should be understood that the control apparatus may be a single integrated system control apparatus, for example, a microgrid control apparatus used for fault detection at the point of interconnection, or may be a control apparatus with independent functions, for example, a combination of a microgrid control apparatus and a comprehensive protection device (a comprehensive protection device or a relay protection device) at the point of interconnection. This is not limited in this embodiment.

It should be understood that, the plurality of converters are power supply devices that have a voltage source mode and a current source mode, and can perform mode switching. In addition, the plurality of converters can automatically detect a fault or an exception at an alternating current end of the converters, and when a set condition is met, automatically switches from the current source mode to the voltage source mode. In this embodiment, the converter operates in the current source mode in an on-grid mode, and the converter operates in the voltage source mode in an off-grid mode.

The following describes a specific control method of the control apparatus provided in embodiments with reference to FIG. 3A and FIG. 3B and FIG. 4A and FIG. 4B.

Figure 3A:
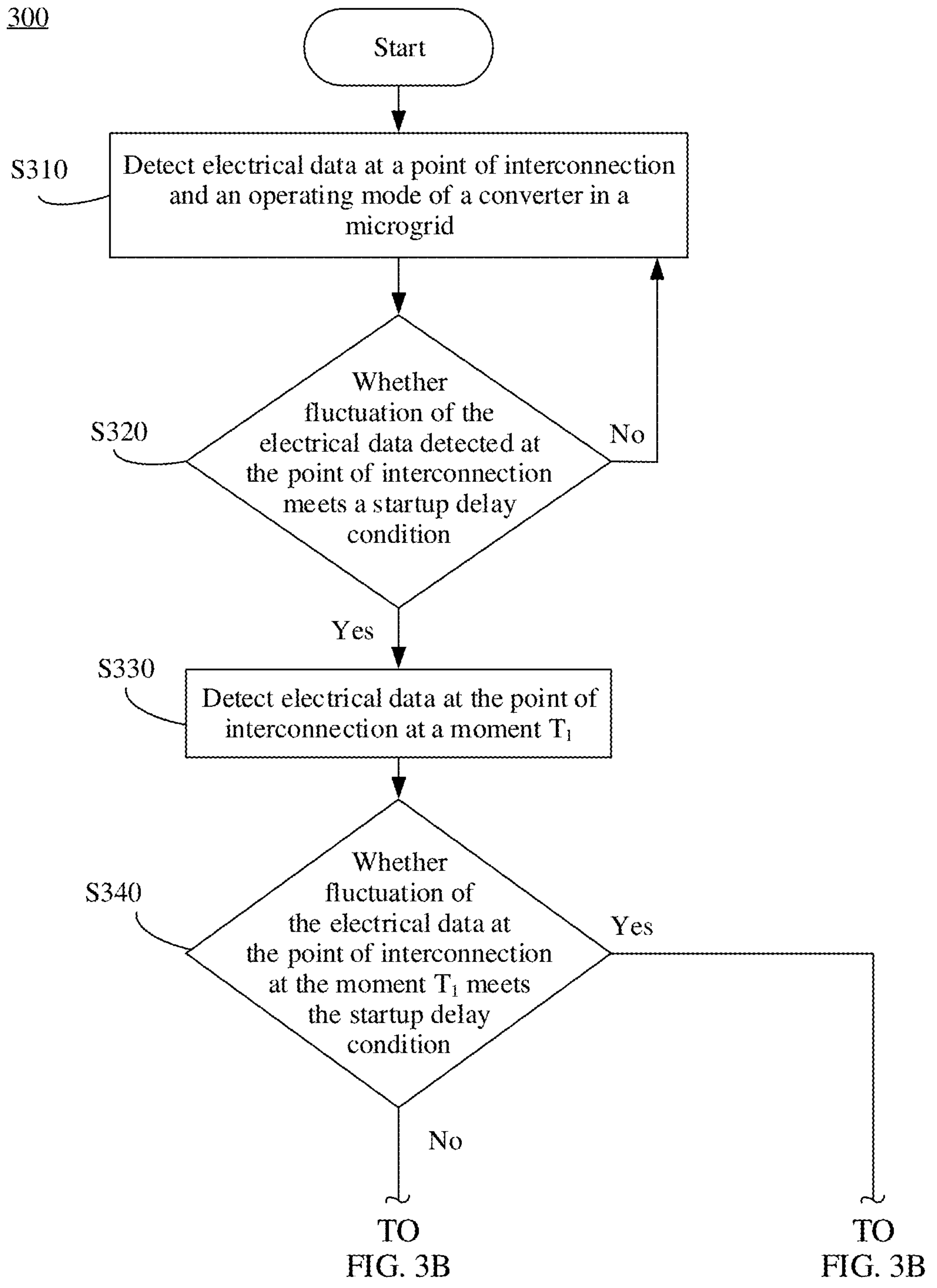
FIG. 3A and FIG. 3B are a diagram of an on/off-grid switching method 300 according to an embodiment.
Figure 3B:
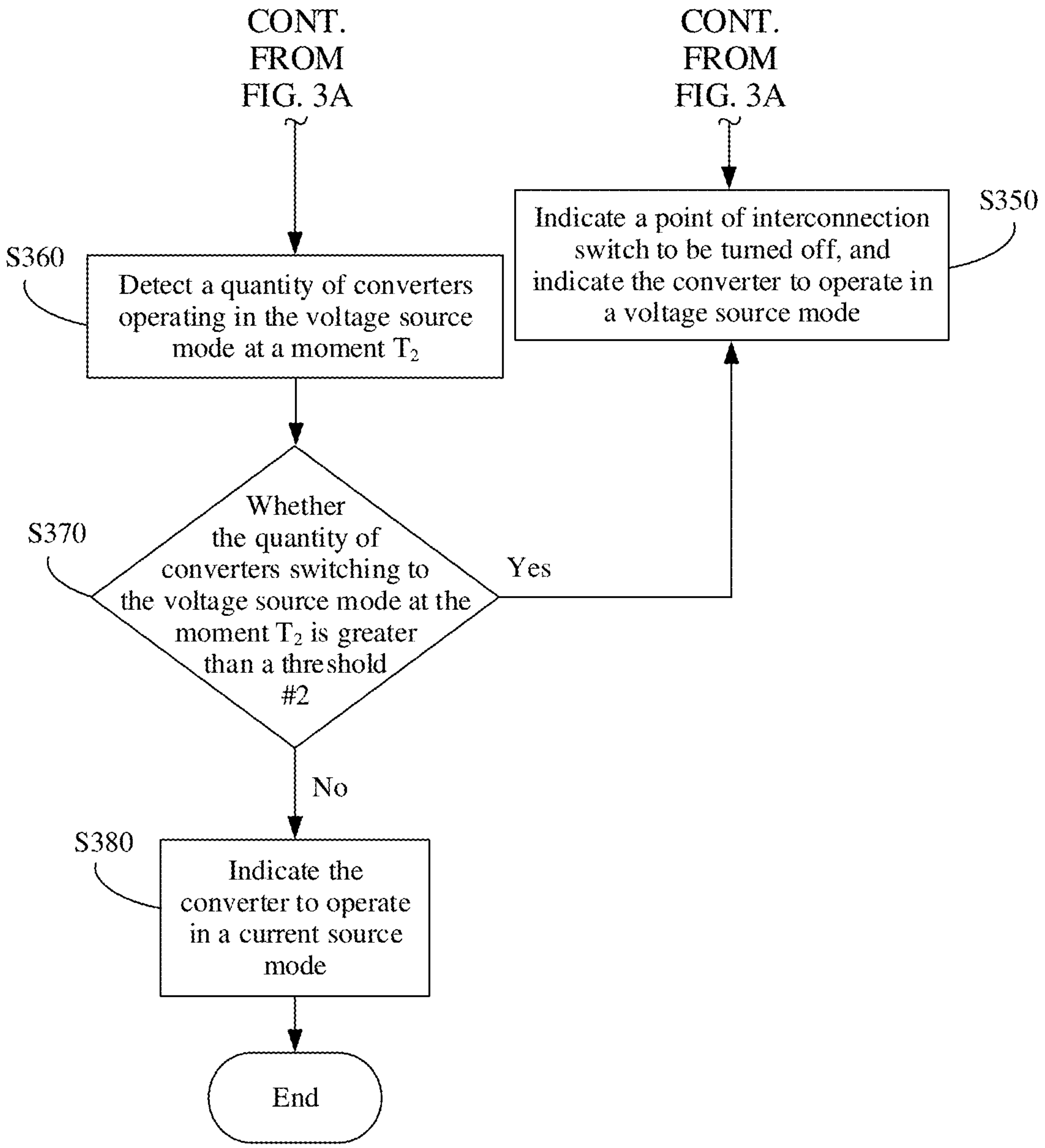

FIG. 3A and FIG. 3B are a diagram of an on/off-grid switching method 300 according to an embodiment. As shown in the figure, the method 300 includes the following steps.

S310: A control apparatus 210 detects electrical data at a point of interconnection and an operating mode of a converter in a microgrid system.

The electrical data at the point of interconnection includes at least one of a current, a voltage, or a frequency at the point of interconnection, and the operating mode of the converter in the microgrid system includes a current source mode and a voltage source mode. The control apparatus 210 is configured to detect at least one of the current, the voltage, and the frequency at the point of interconnection, and detect whether the converter in the microgrid system operates in the current source mode or the voltage source mode. When the electrical data at the point of interconnection fluctuates, or an operating mode of any converter in the microgrid system is switched, subsequent step S320 is performed.

It should be noted that, in this embodiment, the converter in the system can automatically detect a fault or an exception at an alternating current end of the converter, and when a set condition is met, automatically switches from the current source mode to the voltage source mode.

In some possible embodiments, sensitivity of the converter in the microgrid system to detect the fault or the exception of the alternating current grid is lower than that of the control apparatus 210, thereby improving stability of on/off-grid switching of the microgrid system.

S320: The control apparatus 210 determines whether a fluctuation amplitude of the electrical data at the point of interconnection relative to a reference value (briefly referred to as a fluctuation amplitude of the electrical data below for brevity) meets a startup delay condition. The startup delay condition may include that the fluctuation amplitude of the electrical data at the point of interconnection relative to the reference value reaches a preset threshold #1 (such as a first threshold).

It should be understood that the reference value is the electrical data at the point of interconnection when the microgrid system is connected in parallel to an external grid and operates normally, and the fluctuation amplitude of the electrical data relative to the reference value is a difference between actual electrical data at the point of interconnection and the reference value at a same moment.

When the startup delay condition is not met, step S310 is performed. When the startup delay condition is met, the control apparatus uses the current moment as a moment $T_0$, and performs subsequent step S330.

S330: The control apparatus 210 detects electrical data at the point of interconnection at a moment $T_1$ (such as a second moment).

It should be understood that a specific value of an interval between the moment $T_0$ and the moment $T_1$ is not limited in this embodiment. For example, the interval between the moment $T_0$ and the moment $T_1$ is 200 milliseconds (ms).

It should be understood that the control apparatus 210 may continuously detect the electrical data at the point of interconnection within the interval between the moment $T_0$ and the moment $T_1$, or the control apparatus may detect only the electrical data at the point of interconnection at the moment $T_1$. This is not limited in this embodiment.

S340: The control apparatus 210 determines whether a fluctuation amplitude of the electrical data at the point of interconnection at the moment $T_1$ meets the startup delay condition.

If the fluctuation amplitude of the electrical data at the moment $T_1$ meets the startup delay condition, step S350 is performed, so that the microgrid system switches to an off-grid operating state; or if the fluctuation amplitude of the electrical data at the moment $T_1$ does not meet the startup delay condition, step S360 is performed, so that the microgrid system recovers to an on-grid operating state.

It should be understood that, in step S340, the control apparatus 210 determines whether a fault of the external grid persists by determining whether the fluctuation amplitude of the electrical data at the point of interconnection at the moment $T_1$ is greater than the threshold #1, and further performs a subsequent step to control the off/on-grid switching of the microgrid system.

S350: The control apparatus 210 indicates a point of interconnection switch 220 to be turned off, and indicates the converter in the microgrid system to operate in the voltage source mode.

For example, the control apparatus 210 sends a first signal to the point of interconnection switch, and sends a second signal to the converter inside the microgrid system. The first signal indicates the point of interconnection switch to be turned off (or the point of interconnection switch is turned off), and the second signal indicates the converter to operate in the voltage source mode.

It should be understood that the control apparatus 210 may send the second signal to all converters in the microgrid system, or the control apparatus 210 sends the second signal only to a converter that operates in the current source mode in the microgrid system. This is not limited.

As an example instead of a limitation, the microgrid system includes only two converters, and the control apparatus 210 determines that a converter #1 in the microgrid system switches to the voltage source mode at the moment $T_1$, and a converter #2 still operates in the current source mode. In this case, the control apparatus 210 may send the second signal to both the converter #1 and the converter #2, or the control apparatus 210 may send the second signal only to the converter #2. Correspondingly, the converter that receives the second signal operates in the voltage source mode.

S360: The control apparatus 210 detects a quantity of converters operating in the voltage source mode at a moment $T_2$ (such as a third moment).

It should be understood that the control apparatus 210 may determine the operating mode of the converter in the microgrid system through a communication connection, to determine the quantity of converters operating in the voltage source mode in the microgrid system.

It should be understood that the moment $T_2$ is later than the moment $T_1$, and a specific value of an interval between the moment $T_0$ and the moment $T_2$ is not limited in this embodiment. For example, the interval between the moment $T_0$ and the moment $T_2$ is 300 milliseconds (ms).

S370: The control apparatus 210 determines whether the quantity of converters operating in the voltage source mode at the moment $T_2$ is greater than a threshold #2 (such as a second threshold).

For example, if the quantity of converters operating in the voltage source mode at the moment $T_2$ is greater than or equal to the threshold #2, the control apparatus 210 performs step S350; or if the quantity of converters operating in the voltage source mode at the moment $T_2$ is less than the threshold #2, the control apparatus 210 performs step S380.

In this embodiment, the control apparatus 210 may further determine severity of the fault in the external grid based on a relationship between the quantity of converters operating in the voltage source mode at the moment $T_2$ and the threshold #2, to improve accuracy of detecting the fault in the external grid by the control apparatus 210.

S380: The control apparatus 210 indicates the converter to operate in the current source mode.

It should be understood that this step is used to maintain on-grid operation of the microgrid system. For example, the control apparatus 210 controls the point of interconnection switch to remain on, and sends a third signal to the converter in the microgrid system. The third signal indicates the converter to operate in the current source mode, or the third signal indicates the converter to recover to an on-grid mode.

It should be understood that the control apparatus 210 may send the third signal to all the converters in the microgrid system, to indicate all the converters to operate in the current source mode. Alternatively, the control apparatus 210 sends the third signal to a converter that switches to the voltage source mode in the microgrid system, to indicate the converter operating in the voltage source mode to switch to the current source mode. This is not limited.

As an example instead of a limitation, the threshold #2 is 3, and the control apparatus 210 determines that the converter #1 and the converter #2 in the microgrid system switch to the voltage source mode before the moment $T_2$. In this case, the control apparatus 210 sends the third signal to the converter #1 and the converter #2. The third signal indicates the converter #1 and the converter #2 to switch to the current source mode. Correspondingly, the converter #1 and the converter #2 switch to the current source mode in response to the third signal.

It should be understood that a specific value of the threshold #2 is not limited in this embodiment, and may be determined based on a specific requirement of the microgrid system. In an example, when the requirement of the microgrid system is sensitive on/off-grid switching, a small threshold #2 may be set. In another example, the requirement of the microgrid system is on/off-grid switching with strong anti-disturbance, and a large threshold #2 may be set.

Based on the foregoing solution, after the control apparatus 210 detects that the fluctuation amplitude of the electrical data at the point of interconnection meets the startup delay condition, the control apparatus 210 may determine a fault status of the external grid based on the two set delays (such as the moment $T_1$ and the moment $T_2$) with reference to the fluctuation amplitude of the electrical data at the point of interconnection at the moment $T_1$ and the quantity of converters operating in the voltage source mode at the moment $T_2$, to improve accuracy of detecting the fault of the external grid by the microgrid system, and in this way, the microgrid system does not directly switch to the off-grid mode due to minor fault disturbance of the grid.

Optionally, between steps S370 and S380, the following steps (not shown in the figure) are further included.

S371: The control apparatus 210 determines whether the quantity of converters operating in the voltage source mode at the moment $T_2$ is greater than or equal to a threshold #3 (such as a third threshold). The threshold #3 is less than the threshold #2.

If the quantity of converters switching to the voltage source mode is greater than or equal to the threshold #3, that is, the quantity of converters operating in the voltage source mode is greater than or equal to the threshold #3 and less than the threshold #2, step S372 is performed; or if the quantity of converters operating in the voltage source mode is less than the threshold #3, step S380 is performed.

S372: The control apparatus 210 performs overall anti-islanding of the microgrid, and performs off-grid operation or recovers on-grid operation based on a result.

A specific manner in which the control apparatus 210 performs overall anti-islanding of the microgrid is not limited.

As an example instead of a limitation, the control apparatus 210 sends an indication signal to the converter, where the indication signal indicates the converter to change an output voltage. The control apparatus 210 determines, based on whether it is detected that fluctuation of a voltage of the point of interconnection switch exceeds a preset threshold, whether the entire microgrid system is off-grid.

As an example instead of a limitation, the control apparatus 210 sends the indication signal to the converter, where the indication signal indicates the converter to change an output frequency. The control apparatus 210 determines, based on whether it is detected that fluctuation of a frequency of the point of interconnection switch exceeds the preset threshold, whether the entire microgrid system is off-grid.

Further, if the control apparatus 210 determines that the microgrid is off-grid, step S350 is performed; or if the control apparatus 210 determines that the microgrid system is not off-grid, step S380 is performed to recover on-grid operation.

Based on the foregoing solution, the control apparatus 210 may perform overall anti-islanding protection for the microgrid when the quantity of converters operating in the voltage source mode at the moment $T_2$ is between the threshold #2 and the threshold #3, and determine, based on a detection result of the anti-islanding protection, whether to perform on/off-grid switching, thereby improving real-time performance and reliability of the on/off-grid switching of the microgrid system.

Figure 4A:
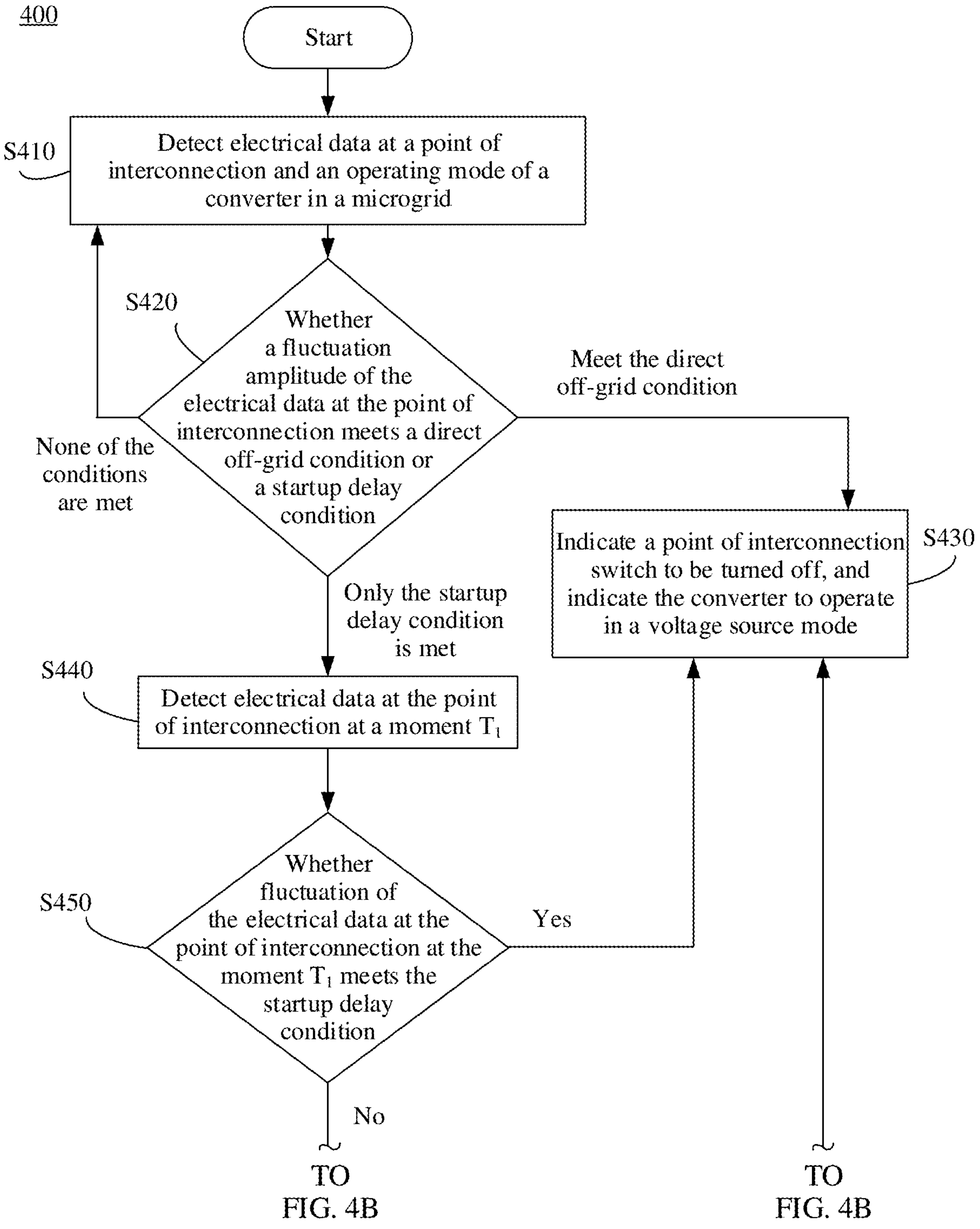
FIG. 4A and FIG. 4B are a diagram of an on/off-grid switching method 400 according to an embodiment.
Figure 4B:
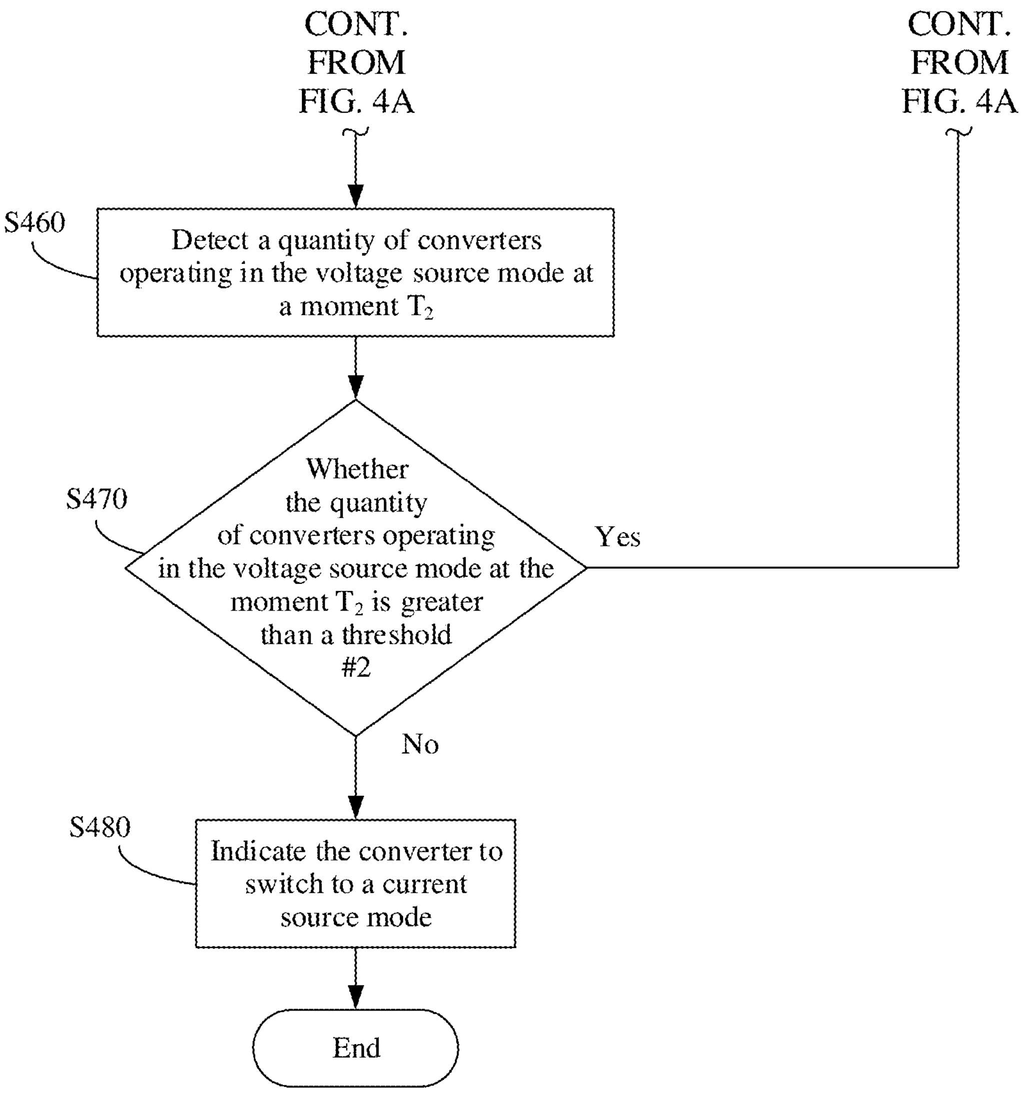

FIG. 4A and FIG. 4B are a diagram of an on/off-grid switching method 400 according to an embodiment. As shown in the figure, the method 400 includes the following steps.

S410: A control apparatus 210 detects electrical data at a point of interconnection and an operating mode of a converter in a microgrid system.

For a specific manner in which the control apparatus detects the electrical data at the point of interconnection and the operating mode of the converter in the microgrid system, refer to related content in S310. Details are not described herein again.

S420: The control apparatus 210 determines whether a fluctuation amplitude of the electrical data at the point of interconnection meets a direct off-grid condition or a startup delay condition.

The direct off-grid may include that the fluctuation amplitude of the electrical data at the point of interconnection reaches a preset threshold #4 (such as an example of a fourth threshold), and the startup delay condition may include that the fluctuation amplitude of the electrical data at the point of interconnection reaches a preset threshold #1. It is easy to understand that a case in which the direct off-grid condition is met corresponds to a case in which a serious fault occurs in an external grid, that is, the threshold #4 is greater than the threshold #1. For example, a normal operating voltage at the point of interconnection is 1 kV, the threshold #1 may be 0.3 kV, and the threshold #4 may be 0.5 kV.

If the fluctuation amplitude of the electrical data at the point of interconnection meets the direct off-grid condition, step S430 is performed, so that quick off-grid can be implemented when a serious fault occurs in the external grid; if the fluctuation amplitude of the electrical data at the point of interconnection meets only the startup delay condition, step S440 is performed; or if the fluctuation amplitude of the electrical data at the point of interconnection does not meet the direct off-grid condition or the startup delay condition, step S410 is performed.

It should be understood that when the fluctuation amplitude of the electrical data at the point of interconnection meets either the direct off-grid condition or the startup delay condition, the control apparatus uses the current moment as a moment $T_0$ (such as a first moment).

S430: The control apparatus 210 indicates a point of interconnection switch 220 to be turned off, and indicates the converter to switch to a voltage source mode.

For example, the control apparatus sends a first signal to the point of interconnection switch, and sends a second signal to a plurality of converters inside the microgrid system. The first signal indicates the point of interconnection switch to be turned off (or the point of interconnection switch is turned off), and the second signal indicates the converter to operate in the voltage source mode.

S440: The control apparatus 210 detects electrical data at the point of interconnection at a moment $T_1$ (such as a second moment).

It should be understood that for specific descriptions of the moment $T_1$, refer to related content in step S330. Details are not described herein again.

S450: The control apparatus 210 determines whether a fluctuation amplitude of the electrical data at the point of interconnection at the moment $T_1$ meets the startup delay condition.

If the fluctuation amplitude of the electrical data at the moment $T_1$ meets the startup delay condition, step S430 is performed, so that the microgrid system switches to an off-grid operating state; or if the fluctuation amplitude of the electrical data at the moment $T_1$ does not meet the startup delay condition, step S460 is performed, so that the microgrid system recovers to an on-grid operating state.

S460: The control apparatus 210 detects a quantity of converters operating in the voltage source mode at a moment $T_2$ (such as a third moment).

It should be understood that, for a specific manner in which the control apparatus 210 determines the quantity of converters operating in the voltage source mode and related specific descriptions, refer to related content in step S360. Details are not described herein again.

In this embodiment, the control apparatus 210 may further determine severity of the fault in the external grid based on a relationship between the quantity of converters operating in the voltage source mode at the moment $T_2$ and the threshold #2, to improve accuracy of detecting the fault in the external grid by the control apparatus 210.

S470: The control apparatus 210 determines whether the quantity of converters operating in the voltage source mode at the moment $T_2$ is greater than the threshold #2 (such as a second threshold).

For example, if the quantity of converters operating in the voltage source mode at the moment $T_2$ is greater than or equal to the threshold #2, the control apparatus 210 performs step S430; or if the quantity of converters operating in the voltage source mode at the moment $T_2$ is less than the threshold #2, the control apparatus 210 performs step S480.

S480: The control apparatus 210 indicates the converter to operate in the current source mode.

It should be understood that this step is used to maintain on-grid operation of the microgrid system. For example, the control apparatus 210 controls the point of interconnection switch to remain on, and sends a third signal to the converter in the microgrid system. The third signal indicates the converter to operate in the current source mode, or the third signal indicates the converter to recover to an on-grid mode.

Based on the foregoing solution, when a serious external fault occurs in the external grid, the control apparatus 210 may quickly switch to an off-grid mode to be isolated from the external grid. When a minor fault occurs in the external grid, the control apparatus 210 may determine a fault status of the external grid based on the two set delays (such as the moment $T_1$ and the moment $T_2$) with reference to the fluctuation amplitude of the electrical data at the point of interconnection at the moment $T_1$ and the quantity of converters operating in the voltage source mode at the moment $T_2$, to improve accuracy of detecting the fault of the external grid by the microgrid system, and in this way, accuracy and effectiveness of switching determining are ensured, and incorrect switching of the microgrid system to the off-grid mode due to grid disturbance is reduced.

Optionally, between steps S470 and S480, the following steps (not shown in the figure) are further included.

S471: The control apparatus 210 determines whether a quantity of converters switching to the voltage source mode at the moment $T_2$ is greater than or equal to a threshold #3 (such as a third threshold), where the threshold #3 is less than the threshold #2.

If the quantity of converters switching to the voltage source mode is greater than or equal to the threshold #3, that is, the quantity of converters switching to the voltage source mode is greater than or equal to the threshold #3 and less than the threshold #2, step S472 is performed; or if the quantity of converters switching to the voltage source mode is less than the threshold #3, step S480 is performed.

S472: The control apparatus 210 performs overall anti-islanding of the microgrid, and performs off-grid operation or recovers on-grid operation based on a result. For a specific manner of the overall anti-islanding of the microgrid, refer to related content in step S372. Details are not described herein again.

Figure 5:
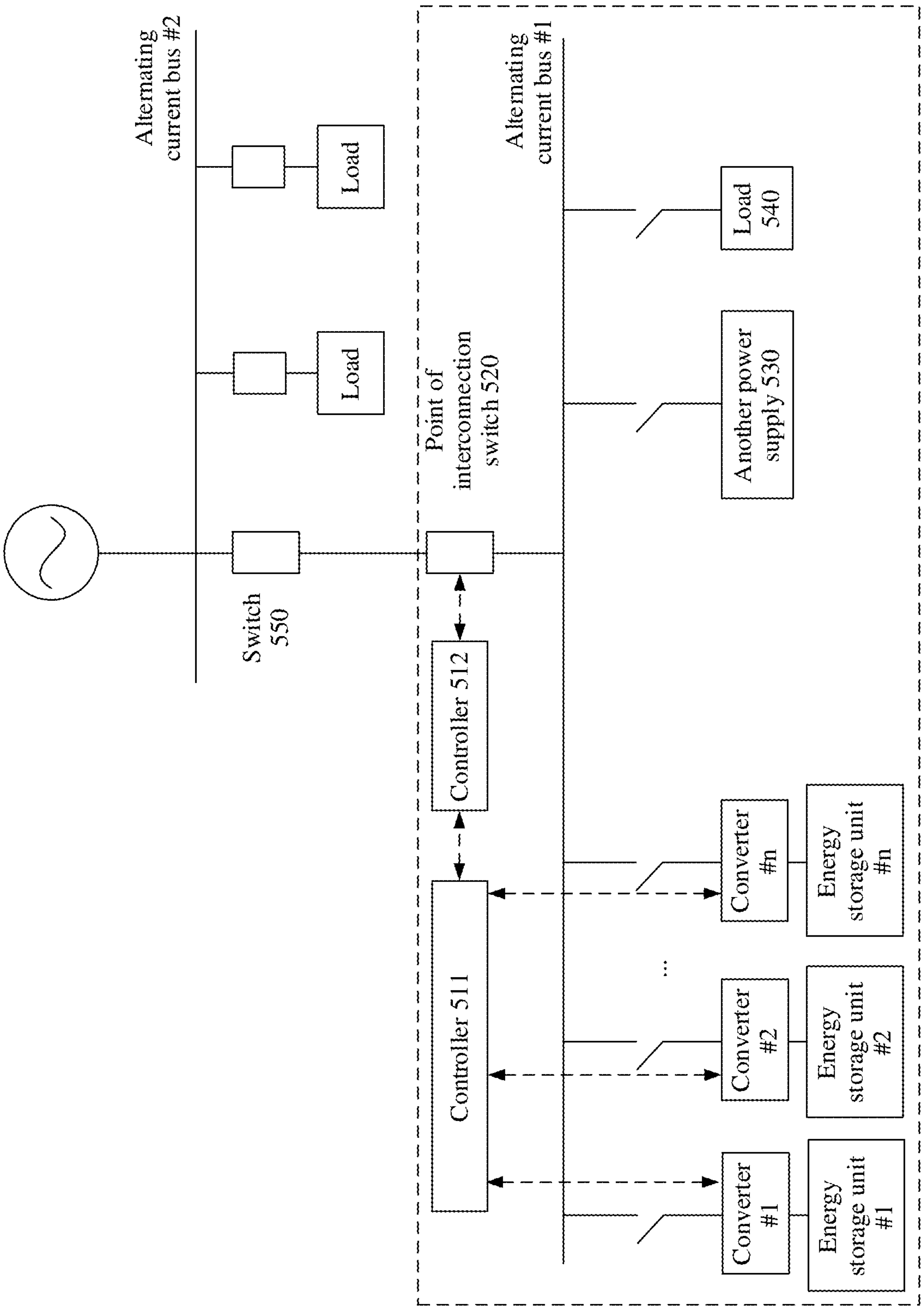
FIG. 5 is a diagram of an architecture of another microgrid system to which an embodiment is applicable.

FIG. 5 is a diagram of an architecture of another microgrid system to which an embodiment is applicable.

As shown in the figure, the system includes a control apparatus 511, a control apparatus 512, a point of interconnection switch 520, a plurality of converters, another power supply 530 (for example, photovoltaic power generation), and a load. It is easy to understand that, different from the system architecture shown in FIG. 2, a separate control apparatus 512 is disposed in the architecture in the figure to connect to the point of interconnection switch. For example, one end of the control apparatus 512 is connected to the point of interconnection switch, and the other end of the control apparatus 512 is connected to the control apparatus 511.

The control apparatus 511 is configured to: monitor an operating mode of the converter in the microgrid system, and control the operating mode of the converter. The control apparatus 512 is configured to monitor a turn-on/off state, a voltage, a frequency, and the like of the point of interconnection switch, may directly detect a fault or an exception of a grid at the point of interconnection, and directly control a turn-on/off operation of the point of interconnection switch based on a fault status.

It should be understood that the control apparatus 512 may be a comprehensive relay protection device commonly used in the industry, or may be another device having a fault detection and protection function. This is not limited in this embodiment.

It should be noted that the methods shown in FIG. 3A and FIG. 3B and FIG. 4A and FIG. 4B are also applicable to the system architecture in FIG. 5. The following uses an example in which the method shown in FIG. 3A and FIG. 3B is applied to the architecture shown in FIG. 5 for description.

S610: The control apparatus 511 controls an operating mode of at least one converter, and the control apparatus 512 detects electrical data at a point of interconnection.

S620: The control apparatus 512 determines whether a fluctuation amplitude of the electrical data at the point of interconnection meets a startup delay condition. If the fluctuation amplitude of the electrical data at the point of interconnection meets the startup delay condition, the control apparatus 512 uses the current moment as a moment $T_0$, and performs step S630; or if the fluctuation amplitude of the electrical data at the point of interconnection does not meet the startup delay condition, performs step S610.

S630: The control apparatus 512 detects electrical data at the point of interconnection at a moment $T_1$ (such as a second moment).

S640: The control apparatus 512 determines whether a fluctuation amplitude of the electrical data at the point of interconnection at the moment $T_1$ meets the startup delay condition.

If the fluctuation amplitude of the electrical data at the moment $T_1$ meets the startup delay condition, step S650 is performed, so that the microgrid system switches to an off-grid operating state; or if the fluctuation amplitude of the electrical data at the moment $T_1$ does not meet the startup delay condition, step S660 is performed, to further determine, with reference to a quantity of converters switching to the voltage source mode in the microgrid system, whether the microgrid system is off-grid.

S650: The control apparatus 511 indicates the converter to switch to the voltage source mode, and the control apparatus 512 indicates the point of interconnection switch 520 to be turned off.

For example, the control apparatus 512 sends a first signal to the point of interconnection switch, and the control apparatus 511 sends a second signal to the plurality of converters inside the microgrid system. The first signal indicates the point of interconnection switch to be turned off (or the point of interconnection switch is turned off), and the second signal indicates the converter to switch to the voltage source mode.

It should be understood that, before the control apparatus 511 and the control apparatus 512 separately send the signal, an occasion for collaboratively sending the signal may be implemented through a communication connection in advance. This is not limited in this embodiment.

S660: The control apparatus 511 detects a quantity of converters operating in the voltage source mode at a moment $T_2$ (such as a third moment).

It should be understood that, after determining the quantity of converters operating in the voltage source mode, the control apparatus 511 may notify the control apparatus 512 through the communication connection.

S670: The control apparatus 511 determines whether the quantity of converters switching to the voltage source mode at the moment $T_2$ is greater than a threshold #2 (such as a second threshold).

For example, if the quantity of converters operating in the voltage source mode at the moment $T_2$ is greater than or equal to the threshold #2, the control apparatus 512 and the control apparatus 511 perform step S650; or if the quantity of converters operating in the voltage source mode at the moment $T_2$ is less than the threshold #2, the control apparatus 511 performs step S670.

S670: The control apparatus 511 indicates the converter to operate in a current source mode.

It should be understood that this step is used to maintain on-grid operation of the microgrid system. For example, the control apparatus 512 controls the point of interconnection switch to remain on, and the control apparatus 511 sends a third signal to the converter in the microgrid system. The third signal indicates the converter to switch to the current source mode, the third signal indicates the converter to operate in the current source mode, or the third signal indicates the converter to recover to an on-grid mode.

The foregoing descriptions are merely specific implementations of embodiments, but are not intended to limit their scope. Any variation or replacement readily figured out by a person skilled in the art shall fall within the scope of the embodiments.

The invention claimed is:

1. A control apparatus used in a microgrid system, wherein the microgrid system comprises the control apparatus, a microgrid bus, a point of interconnection switch, wherein the microgrid bus is configured to connect to an external grid via the point of interconnection switch, and M converters, wherein M≥1, the control apparatus is configured to:

communicatively connect to the M converters and the point of interconnection switch, when a fluctuation amplitude of electrical data, detected at a point of interconnection at a first moment is relative to a reference value, greater than or equal to a first threshold, detect electrical data at the point of interconnection at a second moment, wherein the second moment is later than the first moment; and when a fluctuation amplitude of the electrical data detected at the point of interconnection at the second moment is, relative to the reference value, less than the first threshold, and a quantity of converters operating in a voltage source mode at a third moment is greater than or equal to a second threshold, control the point of interconnection switch to be turned off, and control the M converters to operate in the voltage source mode, wherein the third moment is later than the second moment.

2. The control apparatus according to claim 1, wherein the control apparatus is further configured to:

when the fluctuation amplitude of the electrical data detected at the point of interconnection at the second moment is, relative to the reference value, greater than or equal to the first threshold, control the point of interconnection switch to be turned off, and control the M converters to operate in the voltage source mode.

3. The control apparatus according to claim 1, wherein the control apparatus is further configured to:

when the fluctuation amplitude of the electrical data detected at the point of interconnection at the second moment and relative to the reference value is less than the first threshold, and the quantity of converters operating in the voltage source mode at the third moment is less than the second threshold and greater than or equal to a third threshold, send an indication signal to at least one of the M converters, wherein the indication signal indicates the at least one converter to change output electrical data, and the third threshold is less than the second threshold.

4. The control apparatus according to claim 1, wherein the control apparatus is further configured to:

when the fluctuation amplitude of the electrical data detected at the point of interconnection at the second moment is, relative to the reference value, less than the first threshold, and the quantity of converters operating in the voltage source mode at the third moment is less than a third threshold, control the point of interconnection switch to be turned on, and control the M converters to operate in the current source mode, wherein the third threshold is less than the second threshold.

5. The control apparatus according to claim 1, wherein the control apparatus is further configured to:

when the fluctuation amplitude of the electrical data detected at the point of interconnection at the first moment is, relative to the reference value, greater than or equal to a fourth threshold, control the point of interconnection switch to be turned off, and control the M converters to operate in the voltage source mode, wherein the fourth threshold is greater than the first threshold.

6. The control apparatus according to claim 1, wherein the control apparatus is configured to:

continuously detect the electrical data at the point of interconnection between the first moment and the second moment.

7. The control apparatus according to claim 1, wherein the electrical data comprises at least one of a current, a voltage, or a frequency.

8. The control apparatus according to claim 1, wherein, when the fluctuation amplitude of the electrical data detected at the point of interconnection at the second moment is, relative to the reference value, less than the first threshold, and the quantity of converters operating in the voltage source mode at the third moment is less than the second threshold, control the point of interconnection switch to be turned on, and control the M converters to operate in a current source mode.

9. A microgrid system comprising a control apparatus, a microgrid bus, a point of interconnection switch, wherein the microgrid bus is configured to connect to an external grid via the point of interconnection switch, M converters, and at least one load, wherein M≥1 and the control apparatus is configured to:

communicatively connect to the M converters and the point of interconnection switch, when a fluctuation amplitude of electrical data detected at a point of interconnection at a first moment is, relative to a reference value, greater than or equal to a first threshold, detect electrical data at the point of interconnection at a second moment, wherein the second moment is later than the first moment; and when a fluctuation amplitude of the electrical data detected at the point of interconnection at the second moment is, relative to the reference value, less than the first threshold, and a quantity of converters operating in a voltage source mode at a third moment is greater than or equal to a second threshold, control the point of interconnection switch to be turned off, and control the M converters to operate in the voltage source mode, wherein the third moment is later than the second moment.

10. The microgrid system according to claim 9, wherein the control apparatus is further configured to:

when the fluctuation amplitude of the electrical data detected at the point of interconnection at the second moment is, relative to the reference value, greater than or equal to the first threshold, control the point of interconnection switch to be turned off, and control the M converters to operate in the voltage source mode.

11. The microgrid system according to claim 9, wherein the control apparatus is further configured to:

when the fluctuation amplitude of the electrical data detected at the point of interconnection at the second moment is, relative to the reference value, less than the first threshold, and the quantity of converters operating in the voltage source mode at the third moment is less than the second threshold and greater than or equal to a third threshold, send an indication signal to at least one of the M converters, wherein the indication signal indicates the at least one converter to change output electrical data, and the third threshold is less than the second threshold.

12. The microgrid system according to claim 9, wherein the control apparatus is further configured to:

when the fluctuation amplitude of the electrical data detected at the point of interconnection at the second moment is, relative to the reference value, less than the first threshold, and the quantity of converters operating in the voltage source mode at the third moment is less than a third threshold, control the point of interconnection switch to be turned on, and control the M converters to operate in the current source mode, wherein the third threshold is less than the second threshold.

13. The control apparatus according to claim 1, wherein the control apparatus is configured to:

continuously detect operating modes of the M converters between the second moment and the third moment.

* * * * *